Feb. 9, 1937.   R. D. SMITH   2,070,518
MOTOR VEHICLE GAUGE
Filed July 1, 1935
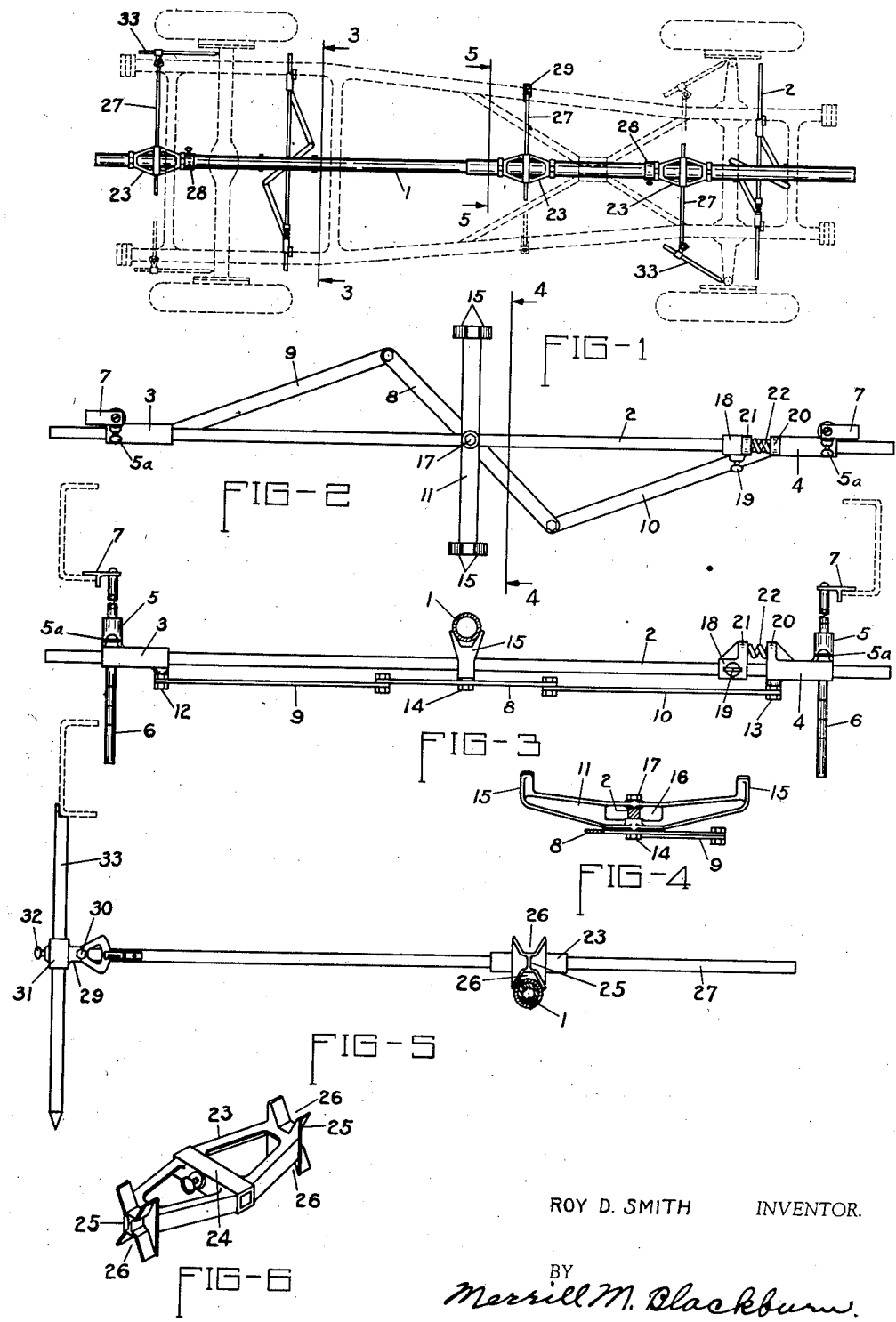
ROY D. SMITH INVENTOR.
BY
Merrill M. Blackburn
ATTORNEY.

Patented Feb. 9, 1937

2,070,518

UNITED STATES PATENT OFFICE 2,070,518

MOTOR VEHICLE GAUGE

Roy D. Smith, Davenport, Iowa, assignor to Bee Line Manufacturing Company, Davenport, Iowa, a corporation of Iowa Application July 1, 1935, Serial No. 29,227

10 Claims. (Cl. 33—191)

The present invention relates to gauges for motor vehicles and particularly such as are useful in the checking of the shape of motor vehicle frames and the straightness and positioning of vehicle axles. Among the objects of this invention are the provision of an improved gauge for the purpose stated; the provision of a gauge which will be automatically centered with relation to the vehicle frame; the provision of an improved gauge which may be used at will for the checking of either the vehicle frame or the axles; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Fig. 1 represents a plan view of my present invention, the same being shown applied to a vehicle which is represented in dotted outline;

Fig. 2 represents a plan view of a supporting and positioning unit for the supporting element upon which the gauging elements are mounted;

Fig. 3 represents a transverse section taken approximately along the plane indicated by the line 3—3, Fig. 1;

Fig. 4 represents a transverse section taken substantially along the plane indicated by the line 4—4, Fig. 2;

Fig. 5 represents a transverse section taken approximately along the plane indicated by the line 5—5, Fig. 1;

Fig. 6 represents a perspective view of an element which I prefer to call a V-block and which serves as positioning means for gauging elements.

Reference will now be made in greater detail to the annexed drawing for a more complete description of this invention. Broadly stated, this invention comprises a center indicating element, supporting means therefor, and gauging elements supported and positioned by the center indicating element. This center indicating element is illustrated as a pipe 1, composed of telescoping sections although elements of various other shapes might be used in place of a pipe. The supporting means for this center indicating element is shown most clearly in Figs. 2 and 3, and comprises a rod or bar 2 having sleeves or slides 3 and 4 thereon which fit the bar closely but nevertheless move readily with reference thereto. These slides are provided with bosses 5, preferably formed integrally therewith, said bosses having openings therein to slidably receive the graduated supporting rods 6. These rods should extend at right angles to the bar 2 and may be secured in adjusted position in the bosses 5 by set screws 5a whereby to hold the bar 2 definitely positioned with relation to the frame of the vehicle. At their upper ends, the rods 6 are provided with supporting elements 7 which have parts to rest upon and to bear against a flange of the vehicle frame member, the same being shown in dotted lines in Fig. 3.

A lever 8 is pivotally connected at its ends to one end of each of the links 9 and 10 which have their remaining ends pivotally connected to the sides 3 and 4, as indicated at 12 and 13. The lever 8 is pivoted at 14 to the bolster or supporting element 11 which has notched upwardly projecting arms 15 and a centrally located opening 16 for the reception of the bar 2. A pivot member 17 connects elements 2 and 11, pivotally, so that the two may move relatively, as necessary. The pivot 14 should be midway between the two pivots at the ends of the lever 8. In this way, the slides 3 and 4 are compelled to move toward or away from the bolster 11 equal distances. An abutment 18 is movable along the bar 2 and may be secured in position by a set screw 19, in any position needful. The slide 4 and abutment 18 are provided with cooperating projections 20 and 21 between which is a spring 22. This preferably is soldered or otherwise secured in openings in the projections 20 and 21 so as to furnish means whereby the slides may be pushed outwardly or pulled inwardly to cause the support to be held in position.

An element 23 referred to as a V-block has a tubular member 24 extending transversely thereof, the tubular portion thereof being preferably angular in shape so that similarly shaped bars passed therethrough will be prevented from rotating. On its opposite ends, this block has supporting brackets 25, preferably formed integrally with the body of the block. These brackets have V-shaped openings 26 extending upwardly and downwardly to position the block accurately with relation to the rod or pipe 1, as shown in Fig. 5. It will be seen from the foregoing that, if this member is made accurately, the axis of a bar 27, when fitted in the tubular member 24 with the block 23 placed on the pipe 1, as shown in Fig. 5, will be sure to be at a right angle with the axis of the pipe 1. Therefore, a bar 27 may be supported on the position-indicating tube 1, extending to either the right or the left, and it will be certain to assume a position exactly at a right angle to the pipe. With stops 28 positioned on the pipe so that the block 23 may be shoved against the end thereof, the block will be sure to assume such positions that the axis of the bar, in its positions to right and left, will be coincident.

The tube 1 has been referred to herein as if it were a single, continuous tube but it is preferred to make it in two sections, one slidable closely within the other, as shown in Fig. 1. It will be understood that wherever the element 1 is referred to as a rod or pipe this language is used in a broad sense as indicating an elongated straight supporting member unless the context requires other interpretation.

At one end of the bar 27 is a holding member 29, pivotally connected at 30 to the bar 27. This holding member 29 comprises a sleeve 31 having a set screw 32 mounted therein for adjustment to hold the indicating rod 33 in adjusted position therein. This rod 33 is shown as being notched at one end for engagement with a frame member and pointed at the other end for any use desired. At the left end of Fig. 1, it is shown in use in checking the straightness of a rear axle housing and its position of angularity with relation to the axis of the vehicle. At the right end of this figure, it is shown in similar use with relation to the front axle of the vehicle. On account of surrounding structure, it is sometimes convenient to have the rod 33 at a different angle from the bar 27 than a right angle and, as shown in Fig. 1, this may be accomplished by turning the body 29 about its pivot 30. It is preferred to use a bolt for the pivot 30 and to have a clamp which may be tightened up to grip the sector connected with the body 29 and hold it in fixed position with relation to the bar 27 so that there will be no shifting during a checking operation. At the right and left ends of Fig. 1, the rod 33 is shown as occupying a substantially horizontal position, and is shown in the middle of this figure as occupying a vertical position.

From what has been said above, it will be understood that one of the supporting assemblies shown in Fig. 2 will be placed adjacent each end of the motor vehicle, being supported in position by the supports or brackets 7. Upon these is laid the pipe 1, resting in the notches of the ends 15 of the bolster 11. The center indicating pipe 1 is therefore held positioned centrally of the vehicle and furnishes a base line from which to measure in checking the correctness of form of the vehicle chassis. In order to make it possible for the slides 3 and 4 to approach each other sufficiently to be used in connection with a narrow part of the frame, as shown at the right hand end of Fig. 1, it is necessary that the abutment 18 be freed to move inwardly a sufficient amount to permit this. The set screw 19 is therefore loosened and the slides 3 and 4 are shoved inwardly until this support will nearly go in between the frame members, in the manner illustrated in Fig. 3. The set screw 19 is then tightened up to hold the abutment 18 in place and the slides 3 and 4 are shoved together enough to permit the application of the brackets 7 to the frame members, as illustrated. This compresses the spring 22 and, when the pressure on the slides is released, the spring causes the slides to move outwardly, with the downwardly projecting abutments of the brackets 7 pressing against the frame members. It is believed that the use of the structure shown in Fig. 5 will be sufficiently clear from what has already been said and therefore repetition will be refrained from.

It will of course be understood that the specific description of structure set forth above may be departed from without departing from the spirit of my invention as set forth in this specification and the appended claims.

Having now described my invention, I claim:

1. In a motor vehicle chassis gauge, in combination, a bar to be suspended from the vehicle frame, a cross-bar pivotally connected to the first named bar at approximately its mid-point, said cross-bar carrying upwardly projecting notched members, a rod or pipe to serve as supporting means for gauging means, slides upon the first named bar, slidable toward and away from the ends of said bar, and supporting means carried by said slides to suspend the first mentioned bar from the vehicle frame.

2. In a motor vehicle chassis gauge, in combination, a bar to be suspended from the vehicle frame, a cross-bar pivotally connected to the first named bar at approximately its mid-point, said cross-bar carrying upwardly projecting notched members, a rod or pipe to serve as supporting means for gauging means, slides upon the first named bar, slidable toward and away from the ends of said bar, supporting means carried by said slides to suspend the first mentioned bar from the vehicle frame, and operating means connecting the slides and the pivot for the cross-bar to cause the slides to move simultaneously, equal distances, in opposite directions.

3. In a motor vehicle gauge, the combination of a supporting unit having suspending elements adjacent its ends, and a rod or pipe supporting element pivotally mounted at the central part of said supporting unit, a rod or pipe placed thereon to be supported thereby, means connecting the suspending elements for moving same longitudinally of the supporting unit, and for actuating the suspending elements and the rod or pipe supporting element relatively to keep the latter centered with relation to the suspending elements.

4. A structure as defined by claim 3 having an abutment cooperating with one of the suspending elements, said abutment being movable along the supporting unit and securable thereto at various adjusted positions.

5. A gauge for a motor vehicle comprising a supporting and positioning member for a support for gauging means, said supporting and positioning member comprising a unitary bar, frame-engaging supports for the bar slidable longitudinally thereof, and connecting means for the supports pivotally connected to the bar and functioning to maintain the supports equally spaced from the pivotal connection of the connecting means to the bar.

6. In a motor vehicle gauge, a supporting and positioning member to support gauging means, comprising a unitary bar, frame-engaging supports for the bar slidable longitudinally thereof, connecting means for the supports pivotally connected to the bar and functioning to maintain the supports equally spaced from the pivotal connection of the connecting means to the bar, notched bar-supporting means pivotally connected to said connecting means and serving as a support for a bar, and a bar extending longitudinally of the motor vehicle and resting in the notch of the supporting means.

7. In a chassis gauge for a motor vehicle, a support comprising a bar having sleeves slidably mounted thereon, said sleeves having openings for said bar and other openings at substantially a right angle to the first mentioned openings, supporting elements slidable through the second mentioned openings in said sleeves and adapted to engage a vehicle frame to support the bar therefrom, and actuating means pivotally connected to the bar and sleeves and normally functioning to keep said supporting elements equally spaced from the pivotal connection of the actuating means to the bar.

8. In a chassis gauge for a motor vehicle, supports to engage a vehicle frame and be supported thereby, bolsters carried by said supports and notched to receive an implement support, a testing implement-support resting on said bolsters and held thereby in the mid-plane of the vehicle, and testing implements supported by the implement support and extending laterally therefrom at a right angle thereto, said implements being shaped to rest on the implement support either side up and be held at right angles thereto in either position.

9. A motor vehicle chassis gauge comprising, in combination, a bar to be suspended from the vehicle frame, a cross bar pivotally connected to the first named bar at approximately its midpoint, said cross bar carrying upwardly projecting notched members, a rod or pipe received in the notches of said notched members to serve as supporting means for gauging means, slides upon the first named bar slidable toward and away from the end of said bar, supporting means carried by said slides and slidable therethrough substantially at a right angle to the first mentioned bar to suspend said first mentioned bar from the vehicle frame, operating means connecting the slides and the pivot for the cross bar to cause the slides to move simultaneously equal distances, in opposite directions, and spring means connecting a slide with the first mentioned bar to force the slides outwardly so that said supporting means will be forced against and held in contact with the vehicle frame members.

10. In a chassis gauge for a motor vehicle, supports to engage a vehicle frame and be supported thereby, bolsters carried by said supports and notched to receive an implement-support, a testing implement-support resting on said bolsters and held thereby in the mid-plane of the vehicle, and testing implements supported by the implement-support and extending laterally therefrom at a right angle thereto, said implements having a positioning member for cooperation with said implement-support, said positioning member having at each end a double V-shaped member defining on opposite sides of the positioning member grooves of V-shape whereby the implements are held at right angles to the implement-support.

ROY D. SMITH.